March 27, 1962  O. W. CLARKE  3,027,029
HYDRAULIC SHOVEL AND LOADER
Filed Aug. 10, 1959  2 Sheets-Sheet 1

Ora W. Clarke
INVENTOR.

BY Clarence A. O'Brien
and Harvey B. Jacobson
Attorneys

March 27, 1962 O. W. CLARKE 3,027,029
HYDRAULIC SHOVEL AND LOADER
Filed Aug. 10, 1959 2 Sheets-Sheet 2
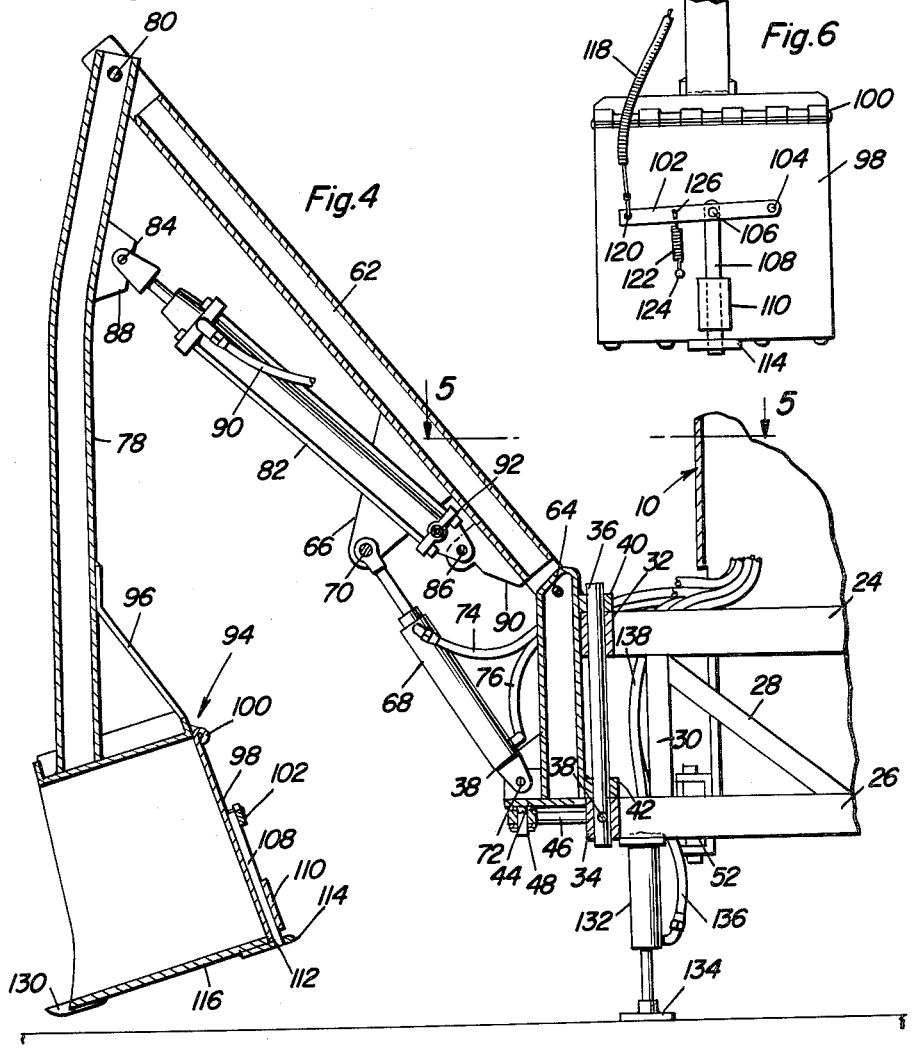
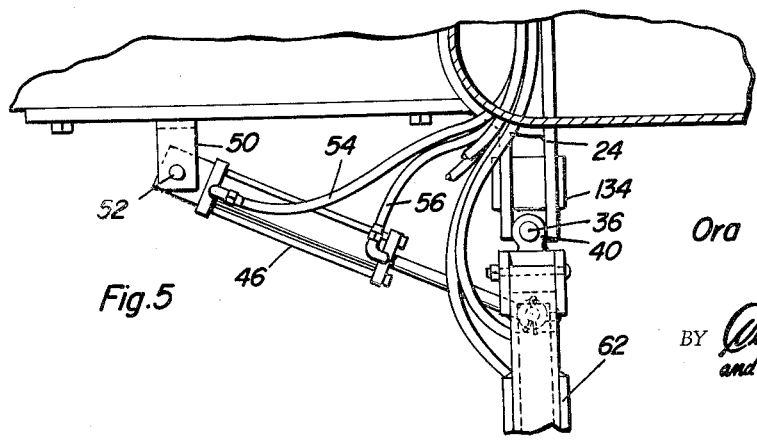
Ora W. Clarke
INVENTOR.
BY Clarence A. O'Brien
and Harvey B. Jacobson
Attorneys

United States Patent Office 3,027,029
Patented Mar. 27, 1962

3,027,029
HYDRAULIC SHOVEL AND LOADER
Ora W. Clarke, 39 High St., Old Town, Maine
Filed Aug. 10, 1959, Ser. No. 832,794
2 Claims. (Cl. 214—501)

This invention relates generally to loading equipment and more particularly to vehicular equipment including shovelling and self-loading means.

It is often desirable to have means associated with a dump truck for shovelling and loading a substance into the truck. When small quantities of dirt, bricks or any load needs to be placed in a vehicle for transporting the load to another site, it often is too expensive to employ a mechanized shovel for placing the load in the dump truck. It will well be realized that it is extremely cumbersome and time consuming to load the truck by hand. Accordingly, it will be appreciated that it is desirable to adapt vehicles, as dump trucks, so that they may have incorporated therewith means for shovelling and loading desired loads into the dump truck.

It is therefore a principal object of this invention to provide novel shovel and loading means which may be easily incorporated with conventional vehicles for enabling loads to be shovelled and lifted into the vehicle body or such.

It is a further object of this invention to provide novel shovel and loading means for use in combination with a vehicle which are relatively simple in construction and accordingly inexpensive to manufacture and incorporate with conventional vehicles as dump trucks.

It is a still further object of this invention to provide shovel and loading means for a vehicle wherein hydraulic cylinders are utilized to operate sections of a bucket carrying boom and wherein the controls for the extensible hydraulic cylinders are conveniently located within the cab portion of the dump truck.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is an enlarged vertical sectional view of the hydraulic shovel and loader;

FIGURE 5 is a fragmentary sectional view taken substantially along the plane 5—5 of FIGURE 4; and FIGURE 6 is an elevational rear view of the bucket carried by the boom.

Figure 1:
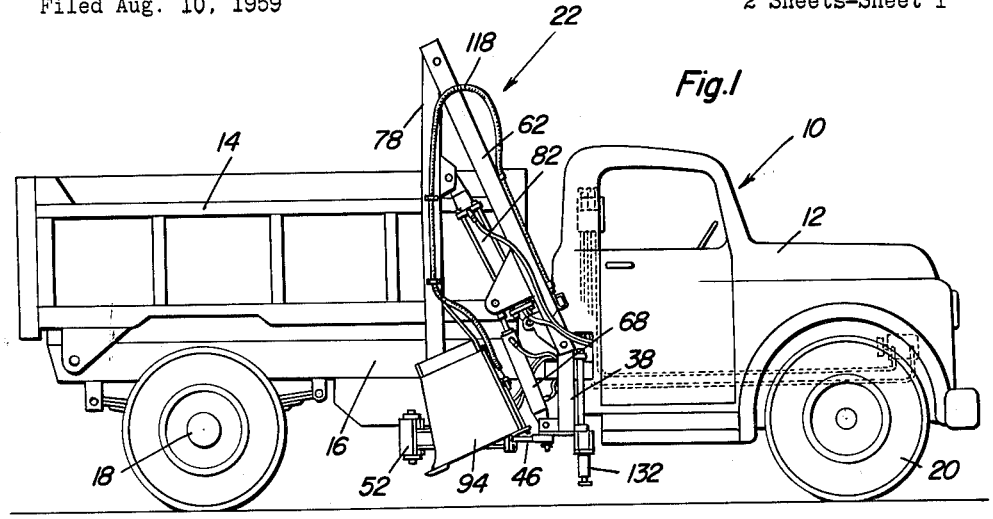
FIGURE 1 is an elevational side view of a dump truck incorporating the hydraulic shovel and loader comprising this invention.
Figure 2:
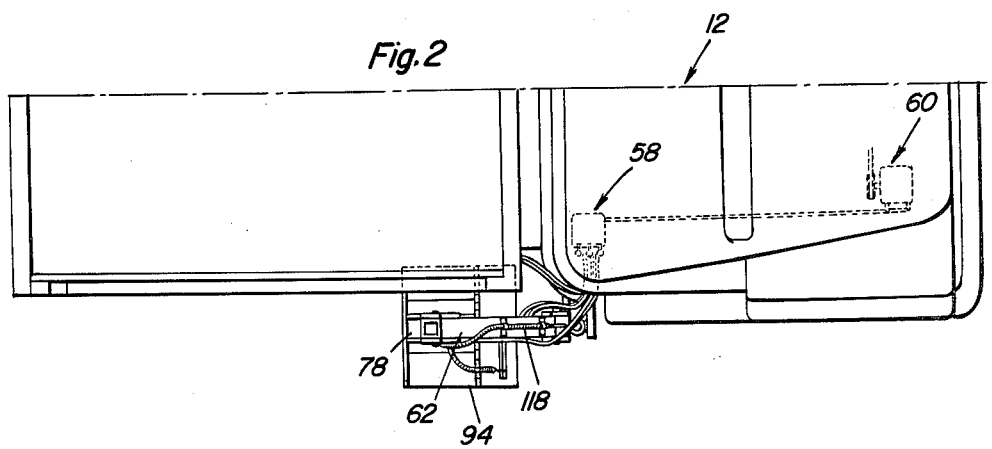
FIGURE 2 is an elevational plan view of the hydraulic shovel and loader illustrating it in combination with one-half of the dump truck body.
Figure 3:
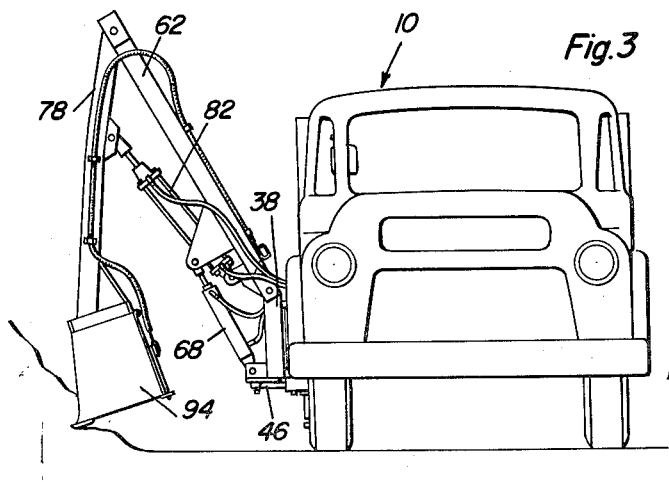
FIGURE 3 is an elevational front view of the hydraulic shovel and loader supported by the dump truck.

With continuing reference to the drawings, the numeral 10 generally represents a conventional vehicle including a cab portion 12 and a dump portion 14 supported on a truck body 16 carried by rotatable ground wheels 18 and 20. The hydraulic shovel and loader is generally designated as 22 and is carried on one side of the vehicle 10 so that it may be utilized for shovelling a quantity of dirt or bricks and lifting it up into the truck dump portion 14. Upper and lower pairs of support members designated as 24 and 26 extend from the truck 10 transverse to the longitudinal axis of the truck. Each of the pairs of support members 24 and 26 include horizontally spaced members with the upper and lower pairs 24 and 26 being spaced vertically. Brace means as 28 and 30 are formed between the upper and lower pairs 24 and 26 so as to rigidify the support construction. Cylindrical collar portions 32 and 34 are terminally formed between the respective support members of the upper and lower pairs and a pin 36 is vertically detachably disposed therein. Fastening means 38 secure the vertically disposed pin 36 to the lower pair of support members 26 so as to prevent movement of the pin therein.

A first boom section 38 has a pair of apertured ears 40 and 42 extending therefrom which pass the pin 36 and rest on the upper and lower pairs of support members 24 and 26. It will therefore be appreciated that the first boom section 38 may pivot about the pin 36 with the pin defining a vertical pivot axis. A lower surface 44 extends from the first boom section 38 diametrically opposed to the extending ears 40 and 42. An extensible first hydraulic cylinder and piston assembly 46 is pivotally secured between the extending surface 44 at 48 and a projecting member 50 at 52. The projecting member 50 is secured to the truck body as particularly illustrated in FIGURE 5. Hydraulic pressure hoses 54 and 56 are provided for controlling the extensibility of the extensible hydraulic cylinders 46. The hoses 54 and 56 extend into the cab portion 12 of the truck 10 and are controllable by control means generally designated as 58 connecting the cylinder 46 to power take-off means generally designated as 60 in the engine portion of the vehicle.

A second boom section 52 is pivotally connected to the first boom section 38 at pivot axis 64 disposed horizontally. A plate 66 is rigidly secured to the second boom section 62 and has a second hydraulic cylinder 68 pivotally connected thereto at 70. The extensible hydraulic cylinder 68 is in turn pivotally connected at 72 to the surface 44 secured to the first boom section 38. Hydraulic cables 74 and 76 are employed for operating the extensible hydraulic cylinder 68 and it will be noted that the hoses 74 and 76 also extend to the control means 58 in the cab portion 12 of the vehicle 10.

A third boom section 78 is pivotally and terminally connected to the second boom section 62 at horizontally disposed pivot axis 80. A third extensible hydraulic cylinder 82 is pivotally supported at 84 and 86 between plates 88 and 90 rigidly secured to the third boom section 78 and second boom section 62 respectively. Cables 90 and 92 extend from the third extensible hydraulic cylinder 82 to the control means 58 within the cab portion 12 of the vehicle 10.

A bucket generally designated as 94 is secured to the third boom section 78. A brace 96 is diagonally secured between the third boom section 78 and bucket 94 to rigidify the construction. The bucket 94 includes a bottom door 98 pivotable about a hinge axis 100. A lever 102 is pivoted on the bottom door 98 about pin 104. Pivotally connected to the lever 102 at the center portion 106 thereof is an arm 108 adapted to reciprocably move within sleeve 110 also secured to the bottom door 98. The arm 108 is adapted to be received within a slot 112 formed in member 114 secured to the front surface 116 of the bucket 94. A Bowden cable 118 is connected to the lever 102 at 120 and extends into the cab portion 12 of vehicle 10. A spring 122 is secured between an opening 124 defined in the bottom door 98 and the lever 102 at 126. It will be appreciated that when the inner portion of the Bowden cable 118 is pulled, the lever 102 will be pivoted about the point 104 so that the arm 108 will be withdrawn from the slot 112 and member 114 to release the bottom door 98 from the front portion 116 to drop the contents of the bucket therefrom. When the bucket is in the position illustrated in FIGURE 4, the bottom door 98 will again fall against the front surface 116 of the bucket 94 when the arm 108 is pulled after which the spring 122 may again carry it into the slot 112. It is to be noted that the front surface 116 of the bucket 94 is supplied with teeth 130 for facilitating the shovelling operation.

Secured to the lower pair of support members 26 is a fourth extensible hydraulic cylinder 132. The hydraulic cylinder 132 serves as a jack and has an enlarged bottom plate 134 adapted to engage the ground to generally support the loading device. Cables 136 and 138 are provided for the control thereof.

It is thought that the constructional details of the invention should now be substantially understood.

In operation, when it is desired to load the dump portion 14 of the truck 10, the bucket 94 may be manipulated by controlling the hydraulic cylinders 46, 68, and 82. The initial hydraulic cylinder will pivot the structure about the pin 36 while the cylinders 68 and 82 allow the operator to extend the boom structure as desired. The cylinder 132 serves as a jack to properly support the structure.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination with a self-propelled vehicle having a dump body, a hydraulic shovel and loader comprising a boom including a plurality of pivotally connected boom sections, a first of said sections having secured thereto a pair of apertured ears extending therefrom, a pin secured to said vehicle adjacent the forward portion of one side of said dump body and extending through said apertured ears whereby said first section is free to pivot thereabout, and a first extensible hydraulic cylinder secured between said first boom section diametrically spaced from said apertured ears and said vehicle for pivoting said first section about said pin, a second boom section pivotally attached to said first boom section at the upper end thereof and a second extensible hydraulic cylinder secured between and below said first and second boom sections for pivoting said second section, said pin defining said first section pivot axis being vertically disposed, said pivotal attachment between said first and second sections defining said second section pivot axis being horizontally disposed, a third boom section pivotally attached to said second boom section at its upper end and defining a third section pivot axis disposed parallel to said second section pivot axis and a third extensible hydraulic cylinder secured between and below said second and third boom sections, a bucket terminally carried by said third boom section and means associated with said bucket for opening and closing said bucket, said vehicle including a cab portion, control means for said extensible hydraulic cylinders disposed in said cab portion and operatively connected to said hydraulic cylinders, and a cable terminally disposed in said cab portion and extending to said bucket for controlling the operation thereof and said boom sections being of such a length and so arranged that said bucket may scoop materials from below the wheels of said vehicle, and lift and dump said materials into said dump body when the scoop is moved by the boom sections and hydraulic cylinders, said shovel and loader being operable to load said dump body when controlled by a single operator located in said cab.

2. The combination of claim 1 wherein said pin is secured to one end of a loader support frame, said frame comprising upper and lower spaced parallel members extending transversely of the vehicle body, brace members connected between the upper and lower members, an hydraulic jack connected to the support frame and adapted when extended to engage a supporting surface below the vehicle.

References Cited in the file of this patent

UNITED STATES PATENTS

| | | |
|---|---|---|
| 2,487,305 | Bridegroom | Nov. 8, 1949 |
| 2,656,058 | Foote | Oct. 20, 1953 |
| 2,661,854 | Adams | Dec. 8, 1953 |
| 2,801,012 | Lederer | July 30, 1957 |
| 2,829,787 | Kalaus | Apr. 8, 1958 |
| 2,834,489 | Davis | May 13, 1958 |
| 2,847,134 | Slate | Aug. 12, 1958 |
| 2,878,951 | Pilch | Mar. 24, 1959 |

FOREIGN PATENTS

| | | |
|---|---|---|
| 1,036,165 | Germany | Aug. 7, 1958 |